US008650431B2

(12) United States Patent
Floyd et al.

(10) Patent No.: US 8,650,431 B2
(45) Date of Patent: Feb. 11, 2014

(54) NON-DISRUPTIVE HARDWARE CHANGE

(75) Inventors: Michael S. Floyd, Cedar Park, TX (US);
Ryan J. Pennington, Austin, TX (US);
Harmony L. Prince, Austin, TX (US);
Kevin F. Reick, Round Rock, TX (US);
David D. Sanner, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 573 days.

(21) Appl. No.: 12/862,492

(22) Filed: Aug. 24, 2010

(65) Prior Publication Data

US 2012/0054544 A1     Mar. 1, 2012

(51) Int. Cl.
*G06F 11/00* (2006.01)
(52) U.S. Cl.
USPC ............................................................ 714/3
(58) Field of Classification Search
USPC ................................ 714/3, 6.32, 10; 713/100
See application file for complete search history.

(56) References Cited

U.S. PATENT DOCUMENTS

| 4,817,092 | A | 3/1989 | Denny | |
| 5,434,868 | A * | 7/1995 | Aichelmann et al. | ......... 714/718 |
| 6,122,756 | A | 9/2000 | Baxter et al. | |
| 7,734,945 | B1 * | 6/2010 | Levidow et al. | ................... 714/3 |
| 7,809,892 | B1 * | 10/2010 | Chatterjee et al. | ............. 711/143 |
| 7,990,847 | B1 * | 8/2011 | Leroy et al. | ..................... 370/216 |
| 2002/0099876 | A1 | 7/2002 | Bui et al. | |
| 2002/0184576 | A1 | 12/2002 | Arndt et al. | |
| 2006/0090097 | A1 * | 4/2006 | Ngan et al. | ........................ 714/6 |
| 2008/0189577 | A1 | 8/2008 | Arndt et al. | |
| 2009/0083579 | A1 | 3/2009 | Lockwood et al. | |
| 2009/0157851 | A1 * | 6/2009 | Dake et al. | .................... 709/220 |

* cited by examiner

*Primary Examiner* — Scott Badderman
*Assistant Examiner* — Yair Leibovich
(74) *Attorney, Agent, or Firm* — Yee & Associates, P.C.; Matthew B. Talpis (57) ABSTRACT

A method, system, and computer program product for changing hardware in a data processing system without disrupting processes executing on the data processing system. A hardware change to a selected portion of hardware in the data processing system may be required, such as to repair hardware errors or to implement a system update. Responsive to a determination that a hardware change to the selected portion of the hardware is required, a process being performed by the selected portion is moved from the selected portion of the hardware to an alternate portion of the hardware. The hardware change is applied to the selected portion of the hardware. The selected portion of the hardware is returned for use by the data processing system after the hardware change is applied.

19 Claims, 5 Drawing Sheets

NON-DISRUPTIVE HARDWARE CHANGE

BACKGROUND

1. Field

The disclosure relates generally to data processing systems, such as multi-processor computer systems, and more specifically to systems and methods for repairing or updating the hardware in such systems.

2. Description of the Related Art

A multi-processor computer system includes multiple processing units. Each processing unit may include one or more processor cores. The processor cores carry out program instructions in order to operate the computer. Each processing unit may comprise one or more integrated circuit microprocessors having various execution units, buffers, memories, and other functional units, which are all formed by integrated circuitry. To facilitate repair and replacement of defective processing unit components, each processing unit may be constructed in the form of a replaceable circuit board, pluggable module, or similar field replaceable unit, which can be easily installed in or swapped out of the system in a modular fashion.

Each processor core may include one or more on-board caches implemented using high speed memory devices. Caches are commonly used to store temporarily values that might be repeatedly accessed by a processor. Use of a cache thus speeds up processing by avoiding the more time consuming process of loading the values from system memory. A processing unit can include a second level cache that supports the lower level caches that are part of the processor cores. Additional cache levels also may be provided.

Transistors forming the integrated circuits on silicon chips degrade over time and are susceptible to various errors. Transistors within arrays, such as transistor arrays forming cache memory, are particularly susceptible to such errors. Transistor errors within such an array may result in data corruption.

The control logic for a cache memory may include error correction code circuits to handle errors that arise in a cache line. A bit in a given cache block may contain an incorrect value either due to a soft error, such as stray radiation or electrostatic discharge resulting in a bit flip, or to a hard error, such as a defective cell. Error correction code can be used to reconstruct the proper data streams in the face of such errors. Some error correction codes can be used to detect and correct only single bit errors. In this case, if two or more bits in a particular block are invalid, then the error correction code might not be able to determine what the proper data stream should actually be. However, at least the failure can be detected. Other error correction codes are more sophisticated and allow detection or correction of multi-bit errors.

Error correction code circuits are one way to deal with soft errors arising in memory cells. Another approach, used for dealing with hard errors, is to provide redundancy within the arrays. If an array is found to be defective, a fuse can be used to indicate its defective nature. A hard fuse can be permanently blown or a soft fuse can be programmably set. A comparison then is made inside the array for each accessed address to see if it matches with a defective address. If so, appropriate logic re-routes the address to one of many extra row and column lines formed on the chip from redundant bit lines and word lines.

Redundancy thus provides for error correction by the logical removal from use of a defective array entry to avoid data corruption or a system outage. In the case of error correction code circuitry, a correctable error is the result of a single bit failure. Ideally, the corresponding array entry also is logically removed from use to prevent the correctable error from turning into an uncorrectable error in the presence of future soft errors.

SUMMARY

According to one illustrative embodiment, a data processing system determines whether a hardware change to a selected portion of hardware in the data processing system is required while the data processing system is executing a process on the selected portion. Responsive to a determination that the hardware change to the selected portion is required, the data processing system moves the process executing on the selected portion to an alternate portion of the hardware. The data processing system applies the hardware change to the selected portion while the process is executing on the alternate portion. The data processing system returns the selected portion for use by the data processing system after applying the hardware change to the selected portion.

A computer program product in accordance with an illustrative embodiment includes a computer readable storage medium having stored thereon computer program instructions for controlling a data processing system to change hardware in the data processing system. The computer program instructions stored on the computer readable storage medium include computer program instructions for controlling the data processing system to determine whether a change to a selected portion of hardware in the data processing system is required while the data processing system is executing a process on the selected portion, to move the process executing on the selected portion to an alternate portion of the hardware in response to a determination that the hardware change to the selected portion is required, to apply the hardware change to the selected portion while the process is executing on the alternate portion, and to return the selected portion for use by the data processing system after applying the hardware change to the selected portion.

A data processing system in accordance with an illustrative embodiment comprises a plurality of processor hardware units. A first one of the plurality of processor hardware units is adapted to determine whether a hardware change to a selected portion of a second one of the plurality of processor hardware units is required while the data processing system is executing a process on the selected portion, to move the process executing on the selected portion to an alternate portion of the plurality of processor hardware units in response to a determination that the hardware change to the selected portion is required, to apply the hardware change to the selected portion while the process is executing on the alternate portion, and to return the selected portion for use by the data processing system after applying the hardware change to the selected portion.

Further objects, features, and advantages will be apparent from the following detailed description and with reference to the accompanying drawings.

DETAILED DESCRIPTION

The different illustrative embodiments recognize and take into account a number of different considerations. For example, the different illustrative embodiments recognize and take into account that provisions can be made in hardware to execute the logical removal of a cache array entry dynamically during runtime to avoid customer downtime due to an error in the array. However, there is a finite number of such "line deletes" that can be completed during runtime due to physical and logical limitations. Additionally, each line delete will reduce the size of the congruence class that incurred the error and, therefore, the effectiveness of the cache. This reduction in cache effectiveness may impact the performance of some user workloads.

The different illustrative embodiments recognize and take into account that arrays instantiated in hardware have redundant or spare entries available. The spare array entries are provided to increase yield in the presence of weak or defective transistors during manufacturing test. Currently, the settings to enable these spare entries must be applied statically at boot time. The different illustrative embodiments recognize and take into account that such spare entries may be used to repair errors in the array that are detected during runtime.

The different illustrative embodiments recognize and take into account that one possible solution would be to allow the spare entry configuration to be updated dynamically. However, this potential solution is prohibitive, due to the volume of data necessary to apply the repair and the complexity of adding dynamic configuration to the array control logic.

The different illustrative embodiments recognize and take into account that another possible solution would be to have firmware apply the static array repairs on the next system reboot. This would allow a user to regain full performance of the array and to guarantee sufficient availability of future dynamic line deletes. However, if too many line deletes accumulate before the next reboot, there is an increased risk of a user outage as well as reduced performance until the user is willing to reboot. If the user does not reboot, and exhausts the line delete capability, a user outage and part replacement may result. The different illustrative embodiments recognize and take into account that, in many cases, expensive and time consuming part replacement may be avoided if a hardware repair may be made prior to a forced shut down resulting from exhausting the line delete capability. Avoiding a forced shut down of user operations will also increase user satisfaction with the system.

The different illustrative embodiments recognize and take into account that a preferred solution for implementing hardware repairs in a data processing system may be applied to all types of repairable entities in hardware, not just cache arrays.

The different illustrative embodiments recognize and take into account that a similar solution may provide for implementing hardware changes other than repairs. For example, the different illustrative embodiments recognize and take into account that a similar solution may provide for implementing hardware changes required by system updates.

A method and apparatus for changing hardware in a data processing system in a manner that is non-disruptive to a user running applications on the system is disclosed. A method and apparatus in accordance with an illustrative embodiment may be used to implement hardware repairs in a manner that avoids the time and cost required by an outage to repair or replace failed hardware. A method and apparatus in accordance with an illustrative embodiment may be used to implement other hardware changes in a non-disruptive manner, such as hardware changes required by system updates.

A data processing system in which a method and apparatus in accordance with an illustrative embodiment may be implemented is illustrated in, and will be described with reference to, FIG. 1. Data processing system 100 in accordance with an illustrative embodiment may be a multi-processor computer having one or more processor hardware units 102, 104, and 106. For example, without limitation, data processing system 100 may be a symmetric multi-processor computer. In a symmetric multi-processor computer all of the processor hardware units 102, 104, and 106 are generally identical. Thus, in a symmetric multi-processor computer system all of the processor hardware units 102, 104, and 106 may use a common set or subset of instructions and protocols to operate, and generally have the same architecture. Only processor hardware unit 102 is described in further detail herein. However, processor hardware units 104 and 106 may be implemented in the same or a similar manner as processor hardware unit 102. Data processing system 100 as illustrated includes three processor hardware units 102, 104, and 106. However, a data processing system in accordance with an illustrative embodiment may have more or fewer than three processor hardware units.

Processor hardware unit 102 may include one or more processor cores 108, 110, and 112. Processor cores 108, 110, and 112 carry out program instructions in order to operate data processing system 100 to perform various processes 114. For example, processes 114 may include operating system function 116 and applications 118. Processor hardware unit 102 as illustrated includes three processor cores 108, 110, and 112. However, a processor hardware unit in accordance with an illustrative embodiment may have more or fewer than three processor cores. Illustrative embodiments will be described in detail herein with particular reference to processor core 112, however, other processor cores 108 and 110 may operate in the same or a similar manner.

In accordance with an illustrative embodiment, processor hardware unit 102 may comprise a single integrated circuit superscalar microprocessor having various execution units, registers, buffers, memories, and other functional units. For example, processor hardware unit 102 may include power on reset engine 120, cache 122, interface 124, and initialization settings 126. Power on reset engine 120 implements restore hardware function 128, which will be described in more detail below. Cache 122 is implemented using high speed memory devices. Cache 122 may include one or more caches at multiple levels within processor hardware unit 102. For example, cache 122 may include, either alone or in any combination, on-board instruction and data caches for each processor core 108, 110, 112, a second level cache that is accessible by each core 108, 110, 112 in processor hardware unit 102, or a higher level cache that may be shared between processor hardware units 102, 104, and 106. Interface 124 may include one or more hardware interfaces that provide an interface for processor hardware unit 102 to other components within, or external to, data processing system 100.

Processor core 112 and power on reset engine 120 are responsive to external interrupts 130. Processor core 112 may respond to external interrupts 130 in a conventional manner. For example, processor core 112 may respond to external interrupts 130 by suspending normal operation of processes 114 to handle external interrupts 130 in a programmed manner. As will be discussed in more detail below, power on reset engine 120 may respond to external interrupts 130 indicating a request to initiate restore hardware function 128.

Data processing system 100 includes main memory 131. Main memory 131 may be implemented as one or more hardware memory components that are accessible for use by the various processor hardware units 102, 104, and 106 of data processing system 100. In accordance with an illustrative embodiment, restore image 132, to be described in more detail below, may be stored in main memory 131.

Data processing system 100 includes hypervisor functions 134 and service processor functions 136. Hypervisor functions 134 and service processor functions 136 are implemented in firmware 138 that may be run on one or more designated processor cores 108, 110, 112 on one or more designated processor hardware units 102, 104, 106 of data processing system 100. Hypervisor functions 134 and service processor functions 136 may be run on processor cores 108, 110, and 112 and processor hardware units 102, 104, and 106 that may be configured, alternatively or additionally, to run other processes 114. Alternatively, dedicated processors may be provided in data processing system 100 to run hypervisor functions 134 or service processor functions 136. For example, one or more dedicated service processors may be provided in data processing system 100 to run service processor functions 136. Hypervisor functions 134 and service processor functions 136 include various functions that will be known to those skilled in the art. Only portions of hypervisor functions 134 and service processor functions 136 that are relevant to non-disruptive hardware repair and update in accordance with illustrative embodiments will be discussed in more detail herein.

In accordance with an illustrative embodiment, data processing system 100 includes determine hardware change function 140. For example, determine hardware change function 140 may be implemented as part of service processor functions 136 in firmware 138. Determine hardware change function 140 determines whether a change to the hardware of data processing system 100 is required. In accordance with an illustrative embodiment, if determine hardware change function 140 determines that a hardware change is required, a non-disruptive hardware change may be implemented in accordance with an illustrative embodiment.

In accordance with an illustrative embodiment, determine hardware change function 140 may determine that a hardware change is required for various different reasons. For example, determine hardware change function 140 may determine that a hardware change is required to repair errors 142 in the system hardware. Alternatively, or additionally, determine hardware change function 140 may determine that a hardware change is required in response to a system update 144.

Determine hardware change function 140 may determine that a hardware change is required to repair errors 142 by use of detect error function 146, collect errors function 148, and threshold 150. For example, detect error function 146 may determine when a repairable error is detected in data processing system 100. Detect error function 146 may be implemented in any appropriate manner to detect repairable errors, depending on the system architecture and the nature of the errors to be detected. Detected repairable errors may be collected by collect errors function 148. In response to collected errors, build image function 151 builds restore image 132. Restore image 132 is a hardware settings or state image that includes the repair settings needed to implement the required hardware changes to correct the repairable errors collected by collect errors function 148. As discussed above, restore image 132 may be stored in main memory 131.

Determine hardware change function 140 may determine that a hardware change is required when threshold 150 is reached. Threshold 150 may be a time period 152 or error level 154.

For example, time period 152 may be set such that a hardware change in accordance with an illustrative embodiment is performed to correct errors periodically. In this case, errors collected by collect errors function 148 may be corrected after the expiration of time period 152 from the last time that a hardware change to correct collected errors was performed. Time period 152 may be set in any desired manner to any desired value in order to achieve desired system performance.

Error level 154 may be defined in terms of detected repairable errors detected by detect error function 146 and collected by collect errors function 148. For example, error level 154 may be set so that error level 154 is reached when collected errors indicate that errors of sufficient number and type have occurred such that a non-disruptive hardware change in accordance with an illustrative embodiment should be made in order to avoid a failure resulting in the forced shut down of data processing system 100. Thus, whether or not error level 154 is reached may be determined by periodic analysis of the errors collected by collect errors function 148. Preferably, whether or not error level 154 is reached may be determined by analysis of the errors collected by collect errors function 148 each time a new repairable error is detected by detect error function 146. Error level 154 may be established in any desired manner to achieve desired system performance. For example, error level 154 may be selected based on a selected combination of numbers of detected correctable errors and types of detected correctable errors so that a non-disruptive hardware change in accordance with an illustrative embodiment is made before a forced shut down of data processing system 100 due to accumulated errors is imminent. More than one error level 154 may be established in accordance with an illustrative embodiment.

In accordance with an illustrative embodiment, both time period 152 and error level 154 thresholds may be used simultaneously. For example, time period 152 may be set such that a non-disruptive hardware change in accordance with an illustrative embodiment is made periodically to repair errors. At the same time, error level 154 may be set so that a non-disruptive hardware change in accordance with an illustrative embodiment may be made between repair operations scheduled by time period 152 if a sudden increase in detected errors indicates that a forced shut down of data processing system 100 due to errors will occur before time period threshold 152 is reached.

Determine hardware change function 140 may determine that a hardware change is required in response to a system update 144 by determining whether an update to data processing system 100 requires such a hardware change. For example, a manufacturer of data processing system 100, or other party, may provide updates to correct firmware or hardware issues that are detected after the initial system release. Such updates may be designed to improve system performance, reliability, and the like. Sometimes, these updates include firmware patches that require an initialization change to the data processing system hardware. Determine hardware change function 140 preferably may determine that such a hardware change is required, so that the required hardware change may be implemented non-disruptively in accordance with an illustrative embodiment.

Hardware changes required by an update, such as updated initialization, may be provided in restore image 132 by update image function 156. Update image function 156 may be implemented in hypervisor functions 134. In this case, restore image 132 is a hardware settings state image that includes the settings needed to implement the hardware changes required by a system update. As discussed above, restore image 132 may be stored in main memory 131.

In accordance with an illustrative embodiment, a non-disruptive hardware change may be initiated when determine hardware change function 140 determines that a hardware change is required. Determine hardware change function 140 determines selected portion 160 of data processing system 100 that will be changed. Selected portion 160 may, for example, correspond to one processor hardware unit 102 of the many processor hardware units 102, 104, 106 in data processing system 100. Alternatively, selected portion 160 may include other portions of the hardware in data processing system 100. For example, selected portion 160 may include one or more of processor cores 108, 110, 112 and related hardware. In general, selected portion 160 may include any subset of data processing system 100 or any portion or region of hardware that may be changed in the manner described herein to implement a non-disruptive hardware change in accordance with an illustrative embodiment.

During implementation of a hardware change in accordance with an illustrative embodiment, move processes function 162 moves any processes 114 executing on selected portion 160 to alternate portion 164 of data processing system 100. For example, where selected portion 160 is processor hardware unit 102, move processes function 162 may move processes 114 executing on selected portion 160 to another processor hardware unit 106. In general, alternate portion 164 may include any portion of data processing system 100, outside of selected portion 160, that is available to run processes 114 to be moved by move processes function 162.

In accordance with an illustrative embodiment, move processes function 162 may be implemented by hypervisor functions 134. Move processes function 162 preferably is implemented in any manner so that a user of processes 114 executing on selected portion 160 may not be aware that processes 114 are being moved to alternate portion 164. In other words, the moving of processes 114 from selected portion 160 to alternate portion 164 does not disrupt any user processes 114, including user applications 118, running on data processing system 100.

After moving processes 114 from selected portion 160, selected portion 160 may be isolated from use by data processing system 100 by isolate function 166. Isolate function 166 may be implemented in hypervisor functions 134. Isolate function 166 may include block interrupts function 168. Block interrupts function 168 isolates selected portion 160 by preventing external interrupts 130 or internal interrupts 170 from reaching selected portion 160. Preventing interrupts 130, 170 from reaching selected portion 160 prevents disruption of the process of implementing a hardware change to selected portion 160.

After selected portion 160 is isolated by isolate function 166, power off function 172 may turn off selected portion 160. Power off function 172 may be implemented in hypervisor functions 134. Power off function 172 may turn off selected portion 160 by sending message 174 to selected portion 160 requesting entry of selected portion 160 into a power down mode.

With selected portion 160 turned off, the required hardware changes to selected portion 160 are made. For example, hardware changes to selected portion 160 may be made by power on reset engine 120 applying restore image 132 to selected portion 160 as part of restore hardware function 128. As discussed above, the required hardware changes to selected portion 160 may include hardware changes to repair errors in selected portion 160. For example, hardware changes to repair errors in selected portion 160 may include changes to enable spare entries in cache 122 or changes to update latch values to steer data paths to spare bits on interface 124 to repair interface fails. As also discussed above, the required hardware changes to selected portion 160 may include hardware changes that do not result from an error in data processing system 100, but that are made to improve or optimize system settings. For example, changes to initialization settings 126 of selected portion 160 may be required by a firmware update to data processing system 100 to improve system performance or reliability.

Enable interrupts function 176 may re-enable interrupts 130, 170 to selected portion 160 after the required hardware changes are applied to selected portion 160. Enable interrupts function 176 may be implemented in hypervisor functions 134. Power on function 178 then may power on selected portion 160. Power on function 178 may be implemented in service processor functions 136. Power on function 178 may power on selected portion 160 by sending interrupt 180 to selected portion 160 requesting the, now changed, selected portion 160 to wake up and restart. With interrupts and power restored to selected portion 160, selected portion 160 is returned for use by data processing system 100.

Instructions in firmware 138 and various other processes 114 operating on data processing system 100, such as operating system function 116 and applications 118, may be located in storage devices that are part of data processing system 100 or that may be coupled in communication with data processing system 100. In these illustrative examples, the instruction are in a functional form. These instructions may be loaded into data processing system 100 to be executed, for example, on the various processor hardware units 102, 104, and 106 of data processing system 100. The processes of the different embodiments may be performed by data processing system 100 using such computer implemented instructions.

These instructions are referred to as program code, computer usable program code, or computer readable program code that may be read and executed by processor hardware units 102, 104, and 106 or other processor hardware on data processing system 100. The program code in the different embodiments may be embodied on different physical or computer readable storage media, such as memory or persistent storage devices.

Program code 188 is located in a functional form on computer readable media 190 that is selectively removable and may be loaded onto or transferred to data processing system 100 to be executed, for example, on processor hardware units 102, 104, and 106. Program code 188 and computer readable media 190 form computer program product 192 in these examples. In one example, computer readable media 190 may be tangible computer readable storage media 194 or computer readable signal media 196. Computer readable storage media 194 may include, for example, an optical or magnetic disk that is inserted or placed into a drive or other device that is part of data processing system 100 for transfer onto a storage device, such as a hard drive or memory device, that is part of data processing system 100. Computer readable storage media 194 also may take the form of a persistent storage device, such as a hard drive, a thumb drive, or a flash memory, that is connected to data processing system 100. In some instances, computer readable storage media 194 may not be removable from data processing system 100. Computer readable storage media 194 specifically excludes mere propagating signals.

Alternatively, program code 188 may be transferred to data processing system 100 using computer readable signal media 196. Computer readable signal media 196 may be, for example, a propagated data signal containing program code 188. For example, computer readable signal media 196 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 188 may be downloaded over a network to data processing system 100 from another device or data processing system through computer readable signal media 196 for use within data processing system 100. For instance, program code stored in a computer readable storage medium in a server data processing system may be downloaded over a network from the server to data processing system 100. The data processing system providing program code 188 may be a server computer, a client computer, or some other device capable of storing and transmitting program code 188.

Figure 1A:
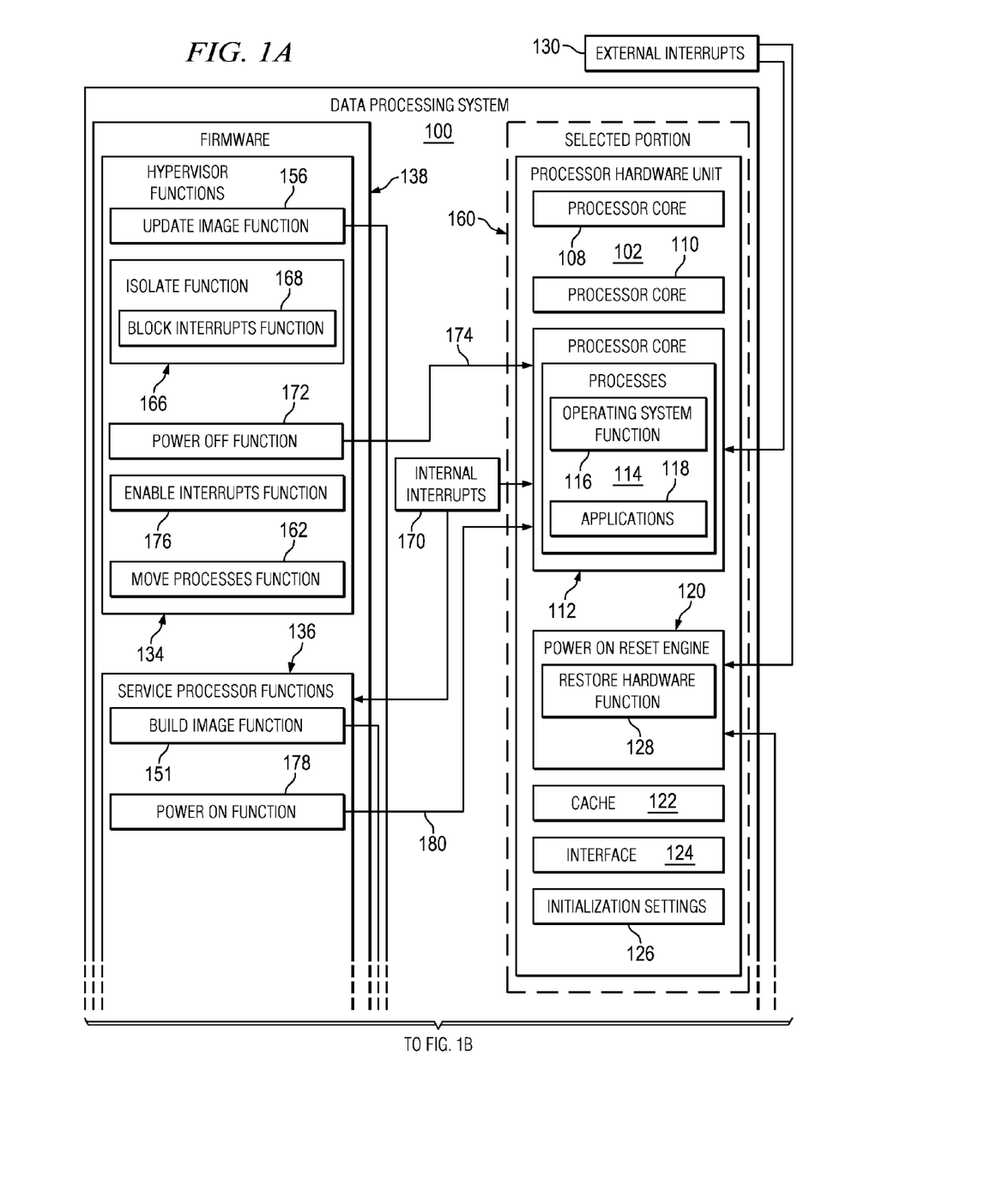
FIG. 1 is a block diagram of a data processing system in which non-disruptive hardware change in accordance with an illustrative embodiment is implemented.
Figure 1B:
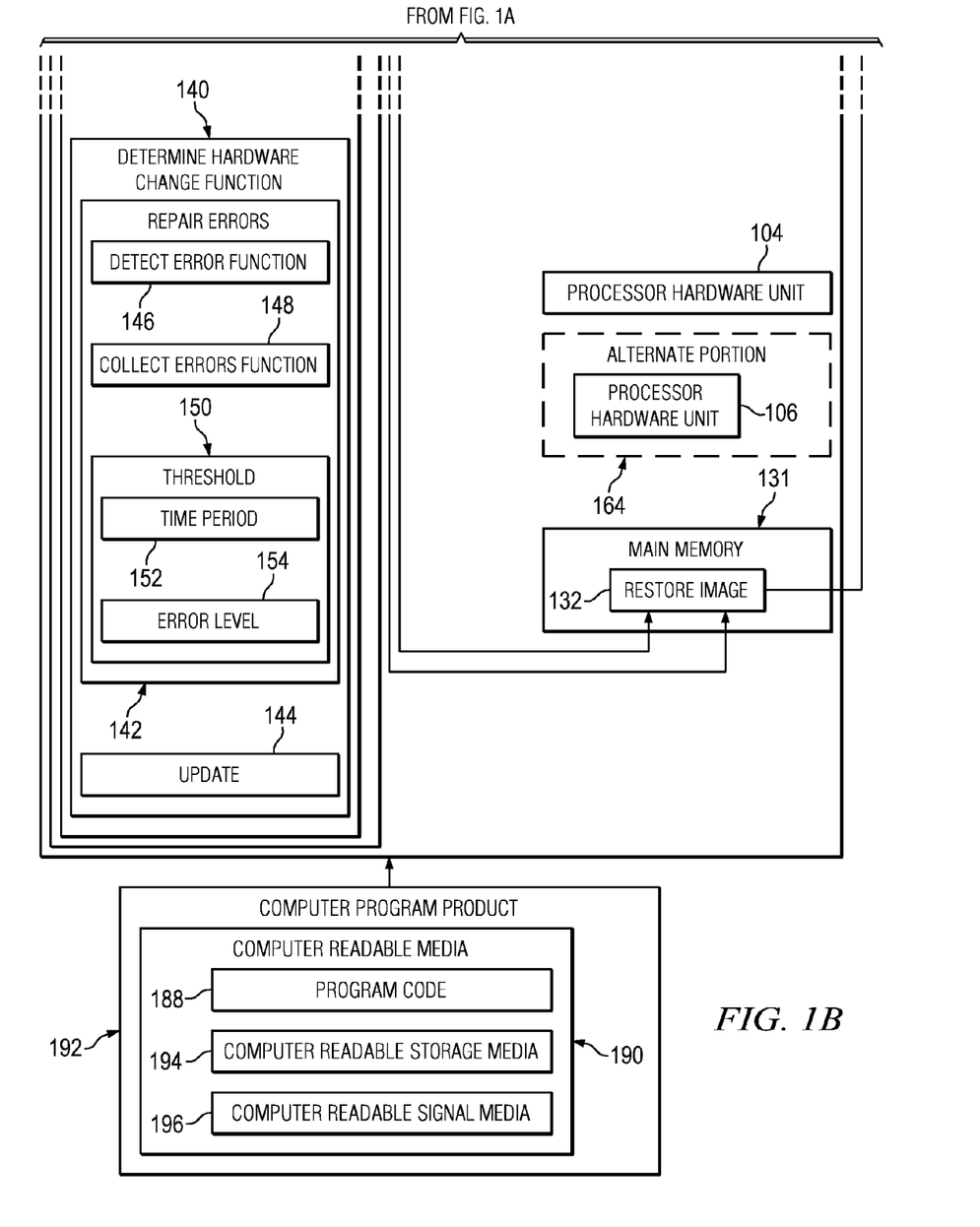

The illustration of FIG. 1 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in FIG. 1 various functions are illustrated as being implemented in firmware 138 as part of hypervisor functions 134 or service processor functions 136. However, in accordance with other embodiments, functions such as determine hardware change function 140, detect error function 146, collect errors function 148, threshold 150, build image function 151, update image function 156, move processes function 162, isolate function 166, power off function 172, enable interrupts function 176, power on function 178, and other functions of illustrative embodiments disclosed herein each may be implemented in firmware or otherwise as part of or separate from hypervisor functions 134 and service processor functions 136. Furthermore, hardware entities to be repaired or otherwise changed are not limited to cache 122, interface 124, and initialization settings 126 as illustrated in FIG. 1. Non-disruptive hardware changes in accordance with advantageous embodiments may be applied to other repairable or changeable hardware entities. The list of possible entities to which non-disruptive hardware change in accordance with other embodiments may be applied will depend on the architecture of a given system in which or for which embodiments are implemented.

Figure 2:
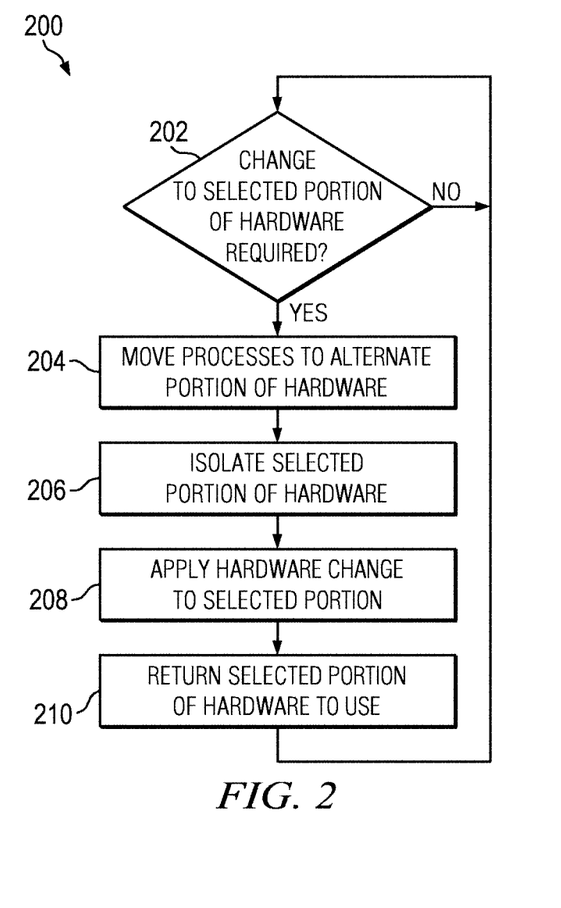
FIG. 2 is a flowchart of a method for changing hardware in accordance with an illustrative embodiment.

Turning now to FIG. 2, a flowchart of a method of non-disruptive hardware change in accordance with an illustrative embodiment is presented. In accordance with an illustrative embodiment, in one implementation the method of FIG. 2 may be implemented in data processing system 100 in FIG. 1.

Method 200 begins with determining whether a hardware change to a selected portion of hardware in a data processing system is required (step 202). In accordance with an illustrative embodiment, step 202 may include determining that a hardware change to a selected portion of hardware is required to repair errors in the selected portion of hardware. Alternatively, step 202 may include determining that a hardware change to a selected portion of hardware is required as a result of an update to the data processing system to improve system performance.

Responsive to a determination in step 202 that a change to the selected portion of hardware is required, any processes executing on the selected portion of hardware are moved to an alternate portion of hardware (step 204). In accordance with an illustrative embodiment, step 204 is implemented such that any user applications or other processes using the selected portion of hardware are not disrupted by moving the processes from the selected portion of hardware to the alternate portion of hardware. Preferably, step 204 may be implemented in a manner such that a user may not even notice a change in operation of any user applications executing on the selected portion of hardware.

The selected portion of hardware then may be isolated from use by the data processing system (step 206). In some cases, isolating the selected portion of hardware may not be required to make the required hardware change. Therefore, the selected portion of hardware to be changed may only need to be isolated as required by the architecture of a given system. For example, step 206 may include blocking interrupts to the selected portion of hardware. If they are not blocked, interrupts to the selected portion of hardware may interfere with the hardware change being performed. In accordance with an illustrative embodiment, step 206 may include also turning off the selected portion of hardware. Turning off the selected portion of hardware effectively removes the selected portion of hardware from use by the data processing system and prepares the selected portion of hardware for a hardware change. In some cases powering off the selected portion of hardware may not be required to make the required hardware change. For example, in some cases a hardware change to a selected portion of hardware may be implemented while the hardware clocks are running.

A hardware change then may be applied to the selected portion of hardware while the selected portion of hardware is isolated from use by the data processing system (step 208). The selected portion of hardware may be returned for use by the data processing system after applying the hardware change to the selected portion of hardware (step 210). Step 210 may include re-enabling interrupts to the selected portion of hardware and restarting the selected portion of hardware.

Method 200 may be repeated to make additional changes to the selected portion of hardware at a later time, as determined by step 202. Method 200 also may be repeated to make changes to other selected portions of hardware in the data processing system.

Figure 3:
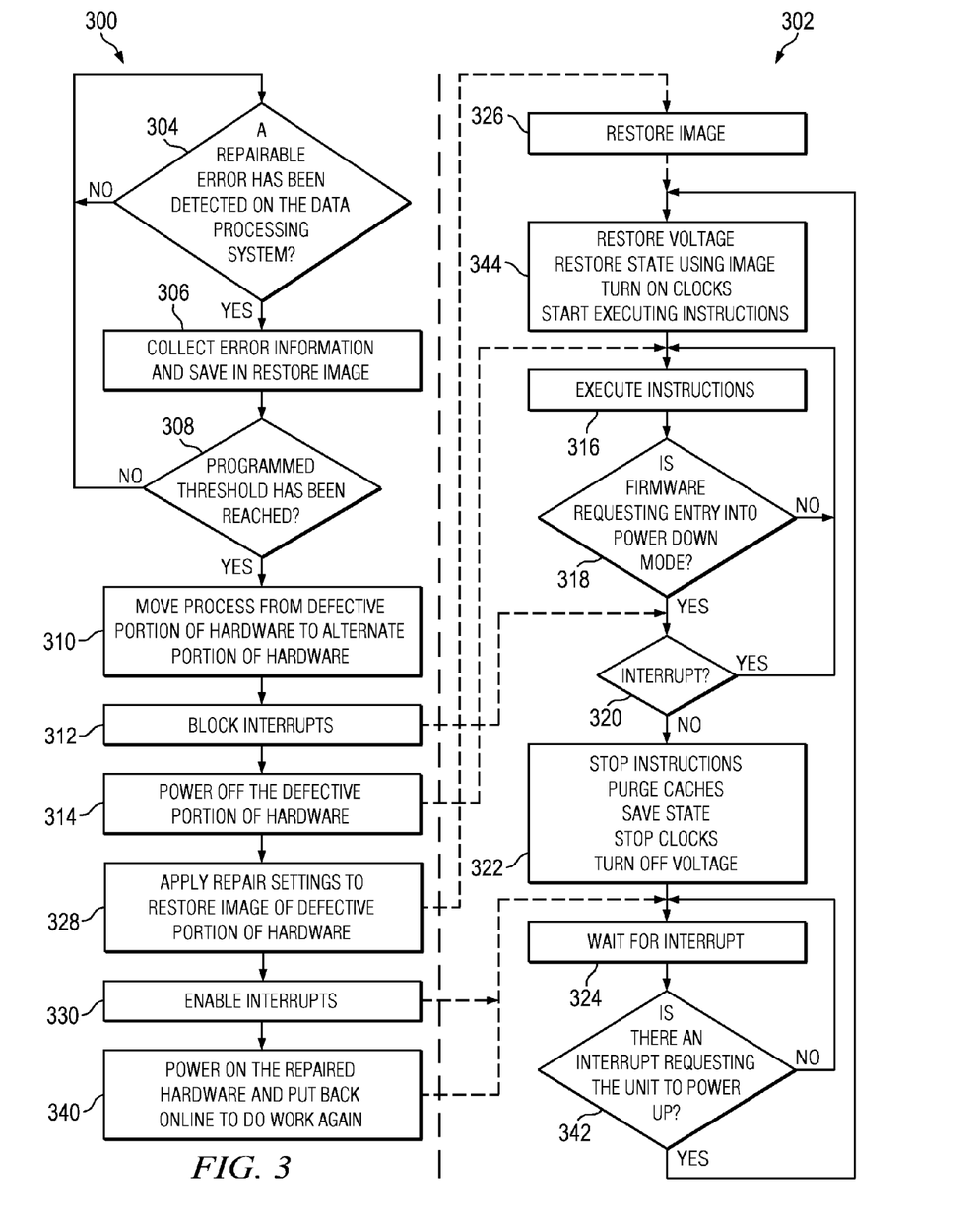
FIG. 3 is a flowchart of firmware and hardware flows for non-disruptive hardware repair in accordance with an illustrative embodiment.

FIG. 3 is a flowchart showing in more detail firmware and hardware flows for an example of non-disruptive hardware repair in accordance with an illustrative embodiment. Firmware flow 300 is shown on the left side of FIG. 3. Corresponding hardware flow 302 is shown on the right side of FIG. 3. In accordance with an illustrative embodiment, in one implementation the method of FIG. 3 may be implemented in data processing system 100 in FIG. 1.

In accordance with an illustrative embodiment, a data processing system determines whether a repairable error has been detected on the data processing system (step 304). If a repairable error is detected, corresponding error information is collected and saved in the restore image (step 306). Steps 304 and 306 are repeated in sequence as additional repairable errors occur and are detected.

As repairable errors are detected and collected, the data processing system determines whether a programmed threshold has been reached (step 308). Step 308 may be repeated each time a repairable error is detected and collected until the programmed threshold has been reached. Alternatively, step 308 may be repeated periodically until the programmed threshold has been reached. Fore example, step 308 may be repeated periodically with a fixed or variable time period between each repetition of the step.

As discussed above, the programmed threshold may be a time period between hardware changes. In this case, step 308 may include using a timer to determine whether the programmed threshold has been reached. As also discussed above, the programmed threshold may be a level of detected repairable errors. In this case, step 308 may include analyzing the collected error information to determine whether the programmed threshold has been reached.

In response to determining that the programmed threshold has been reached, any process operating on a defective portion of hardware to be repaired is moved to an alternate portion of the data processing system hardware (step 310). In accordance with an illustrative embodiment, step 310 may be implemented such that any user applications or other processes using the selected portion of hardware are not disrupted by moving the process from the selected portion of hardware to the alternate portion of hardware. Preferably, step 310 may be implemented in a manner such that a user may not even notice a change in operation of any user applications executing on the selected portion of hardware.

After removing any processes from the selected portion of hardware, interrupts to the selected portion of hardware may be blocked (step 312). Step 312 operates to isolate the selected portion of hardware from the data processing system so that interrupts to the selected portion of hardware do not interfere with the hardware change being performed.

The selected portion of hardware then may be powered off (step 314). Step 314 may include sending an instruction to the selected portion of hardware to enter into a power down mode. The instruction is executed, along with other instructions, by the selected portion of hardware (step 316). While executing instructions, the selected portion of the hardware determines whether a received instruction indicates that the firmware is requesting entry into a power down mode (step 318).

For example, non-disruptive hardware change in accordance with an illustrative embodiment may be implemented in a data processing system POWER architecture provided by International Business Machines Corporation. In such an application, step 314 may include sending a "winkle" instruction to the selected portion of hardware. Winkle is an architected instruction specific to this data processing system architecture. The winkle instruction instructs a processor core to stop executing instructions and enter a power down mode. This instruction is normally for use when a processor core is in an idle state to save power. In this case, however, the winkle instruction may be used as a mechanism to provide for non-disruptive hardware changes.

Executing instructions by the selected portion of the hardware, including an instruction to enter into a power down mode, may be disrupted by the receipt of an interrupt (step 320). However, in this case, interrupts to the selected portion of hardware have been blocked by step 312. Therefore, an interrupt will not be detected at step 320, and the instruction to enter power down mode will be implemented by the selected portion of hardware (step 322).

Step 322 may include any functions necessary for the orderly power down of the selected portion of hardware. For example, step 322 may include stopping the execution of instructions by the selected portion of hardware, purging caches associated with the selected portion of hardware, saving the current state of the selected portion of hardware, stopping system clocks for the selected portion of hardware, and turning off voltage to the selected portion of hardware. Step 322 removes the selected portion of hardware from use by the data processing system and prepares the selected portion of hardware for a hardware change. After powering down, the selected portion of hardware waits for an interrupt indicating that the selected portion of hardware should be restarted (step 324).

Repair settings are applied to restore image 326 of the defective portion of hardware being repaired (step 328). Preferably, step 328 is implemented while the selected defective portion of hardware is turned off and thus isolated from use by the data processing system. Restore image 326 thus contains hardware changes for the defective portion of hardware to repair detected repairable errors. For example, restore image 326 may include repair settings to implement cache repairs, latch value changes to steer data paths to spare bits on an interface to repair interface errors, or changes to implement repairs in any other repairable hardware entity, either alone or in any possible combination. Repairable hardware entities will depend on the architecture of a given system to be repaired.

After applying repair settings to restore image 326 for the defective portion of hardware, interrupts to the selected defective portion of hardware are re-enabled (step 330). The selected portion of hardware then may be turned on and the repaired selected portion of hardware put back on line and available for use by the data processing system (step 340). For example, step 340 may include sending an interrupt to the selected portion of hardware. Since interrupts to the selected portion of hardware were enabled in previous step 330, the interrupt is received by the selected portion of hardware at step 324. The selected portion of hardware determines whether the received interrupt is a request for the selected portion of hardware to power on (step 342). In response to a request to power on, the selected portion of hardware powers on and begins normal operation (step 344). Step 344 may include any functions necessary for the orderly power up of the selected portion of hardware. For example, step 344 may include restoring voltage to the selected portion of hardware, restoring the hardware state using restore image 326, turning on system clocks for the selected portion of hardware, and starting execution of instructions in a normal manner. Since restore image 326 includes the repair settings for the selected portion of hardware, restoring the hardware state using restore image 326 in step 344 applies the desired repair settings to the selected portion of hardware.

Figure 4:
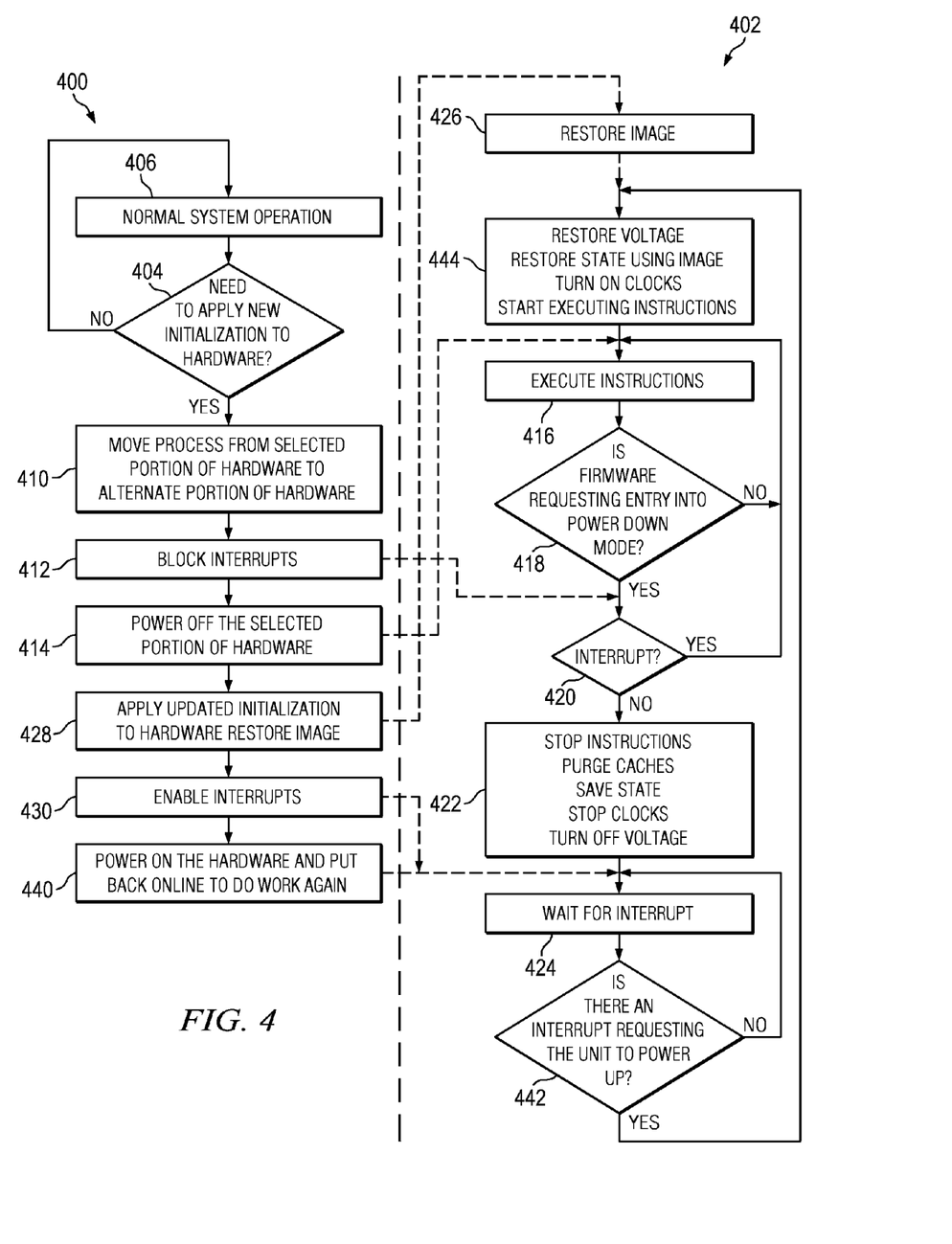
FIG. 4 is a flowchart of firmware and hardware flows for non-disruptive hardware update in accordance with an illustrative embodiment.

FIG. 4 is a flowchart showing in more detail firmware and hardware flows for an example of non-disruptive hardware change required by a system update in accordance with an illustrative embodiment. Firmware flow 400 is shown on the left side of FIG. 4. Corresponding hardware flow 402 is shown on the right side of FIG. 4. In accordance with an illustrative embodiment, in one implementation the method of FIG. 4 may be implemented in data processing system 100 in FIG. 1.

In accordance with an illustrative embodiment, a data processing system determines whether a hardware change to a selected portion of hardware is required by an update to the data processing system (step 404). For example, step 404 may be performed during normal system operation (step 406). Step 404 may be performed periodically during normal system operation or may be performed each time an update that may require a hardware change is received by the data processing system. For example, step 404 may include determining that a firmware update received by the data processing system to improve system performance, reliability, or the like requires an initialization change to a selected portion of the system hardware.

In response to determining that a hardware change is required by an update to the data processing system, any process operating on a selected portion of hardware to be changed is moved to an alternate portion of the data processing system hardware (step 410). In accordance with an illustrative embodiment, step 410 may be implemented such that any user applications or other processes using the selected portion of hardware are not disrupted by moving the process from the selected portion of hardware to the alternate portion of hardware. Preferably, step 410 may be implemented in a manner such that a user may not even notice a change in operation of any user applications executing on the selected portion of hardware.

After removing any processes from the selected portion of hardware, interrupts to the selected portion of hardware may be blocked (step 412). Step 412 operates to isolate the selected portion of hardware from the data processing system so that interrupts to the selected portion of hardware do not interfere with the hardware change being performed.

The selected portion of hardware then may be powered off (step 414). Step 414 may include sending an instruction, such as the "winkle" instruction described above, to the selected portion of hardware to enter into a power down mode. The instruction is executed, along with other instructions, by the selected portion of hardware (step 416). While executing instructions, the selected portion of the hardware determines whether a received instruction indicates that the firmware is requesting entry into a power down mode (step 418). Executing instructions by the selected portion of the hardware, including an instruction to enter into a power down mode, may be disrupted by the receipt of an interrupt (step 420). However, in this case, interrupts to the selected portion of hardware have been blocked by step 412. Therefore, an interrupt will not be detected at step 420, and the instruction to enter power down mode will be implemented by the selected portion of hardware (step 422).

Step 422 may include any functions necessary for the orderly power down of the selected portion of hardware. For example, step 422 may include stopping the execution of instructions by the selected portion of hardware, purging caches associated with the selected portion of hardware, saving the current state of the selected portion of hardware, stopping system clocks for the selected portion of hardware, and turning off voltage to the selected portion of hardware. Step 422 removes the selected portion of hardware from use by the data processing system and prepares the selected portion of hardware for a hardware change. After powering down, the selected portion of hardware waits for an interrupt indicating that the selected portion of hardware should be restarted (step 424).

Update settings are applied to restore image 426 of the selected portion of hardware (step 428). Preferably, step 428 is implemented while the selected portion of hardware is turned off and thus isolated from use by the data processing system. Restore image 426 thus contains hardware changes for the selected portion of hardware as required by an update to the data processing system. Restore image 426 may include any changes to the selected portion of hardware that may be required by a system update. For example, restore image 426 may include initialization changes to the selected portion of hardware.

After applying updated initialization or other changes required by an update to restore image 426 for the selected portion of hardware, interrupts to the selected portion of hardware are re-enabled (step 430). The selected portion of hardware then may be turned on and the updated selected portion of hardware put back on line and available for use by the data processing system (step 440). For example, step 440 may include sending an interrupt to the selected portion of hardware. Since interrupts to the selected portion of hardware were enabled in previous step 430, the interrupt is received by the selected portion of hardware at step 424. The selected portion of hardware determines whether the received interrupt is a request for the selected portion of hardware to power on (step 442). In response to a request to power on, the selected portion of hardware powers on and begins normal operation (step 444). Step 444 may include any functions necessary for the orderly power up of the selected portion of hardware. For example, step 444 may include restoring voltage to the selected portion of hardware, restoring the hardware state using restore image 426, turning on system clocks for the selected portion of hardware, and starting execution of instructions in a normal manner. Since restore image 426 includes update settings for the selected portion of hardware, restoring the hardware state using restore image 426 in step 444 applies the desired update changes to the selected portion of hardware.

One or more of the illustrative embodiments thus provides a capability to make hardware changes in a data processing system without disrupting user applications executing on the system. In accordance with an illustrative embodiment, hardware changes to a selected portion of the hardware may be made by first moving processes being performed by the selected portion of the hardware to an alternate portion of the hardware without disrupting operation of such processes. The selected portion of the hardware then may be isolated from use by the data processing system and powered down. Hardware changes to the selected portion of the hardware may be made when the selected portion of the hardware is isolated from use by the data processing system. The selected portion of the hardware may be powered up and enabled for use by the data processing system after the required hardware changes are made. Hardware changes to repair detected repairable errors in the system hardware thus may be made without shutting down the system and before the errors result in a forced system shut down. Expensive and time consuming replacement of hardware components following a forced system shut down thus may be avoided. Hardware changes required by system firmware updates also may be made without disrupting user applications running on the system. Since the illustrative embodiments permit various hardware changes to be made without disrupting user applications running on a system, user satisfaction with the system is enhanced.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with any system, apparatus, or device for running a program. A computer readable storage medium specifically excludes mere propagating signals.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with any system, apparatus, or device for running a program.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the illustrative embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the illustrative embodiments are described with reference to flowchart illustrations and/or block diagrams of methods, apparatus (systems) and computer program products according to various illustrative embodiments. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions also may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions also may be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various illustrative embodiments. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, occur substantially concurrently, or the blocks may sometimes occur in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed.

The description of the illustrative embodiments provided herein has been presented for purposes of illustration and explanation, but is not intended to be exhaustive or to limit the invention to the form disclosed. Many modifications and variations will be apparent to those of ordinary skill in the art without departing from the scope and spirit of the invention. The illustrative embodiments were chosen and described in order to best explain the principles of the invention and the practical application, and to enable others of ordinary skill in the art to understand the invention for various embodiments with various modifications as are suited to the particular use contemplated.

What is claimed is:

1. A method of changing hardware in a data processing system, comprising:

detecting, by the data processing system, repairable errors on a selected portion of hardware in the data processing system, wherein the data processing system is a multi-processor system including a plurality of processor hardware units, wherein the selected portion is one of the plurality of processor hardware units;
determining, by the data processing system, whether a threshold has been reached;
responsive to determining that the threshold has been reached, generating, by the data processing system, a determination that a hardware change to be performed on the selected portion of hardware in the data processing system is required while the data processing system is executing a process on the selected portion;
responsive to the determination that the hardware change to the selected portion is required, moving, by the data processing system, the process executing on the selected portion to an alternate portion of the hardware, wherein the alternate portion is a different one of the plurality of processor hardware units;
applying, by the data processing system, the hardware change to the selected portion while the process is executing on the alternate portion, wherein the hardware change is selected from the group consisting of changes to enable spare entries in a cache of the one of the plurality of processor hardware units, changes to update latch values of the one of the plurality of processor hardware units to steer data paths to spare bits on a hardware interface of the one of the plurality of processor hardware units to repair interface fails of the hardware interface, and combinations thereof, wherein applying the hardware change to the selected portion comprises: responsive to detecting the repairable errors in the data processing system building, by the data processing system, a restore image including repair settings required to repair the detected reparable errors; and applying, by the data processing system, the restore image to the selected portion to repair the repairable errors; and
returning, by the data processing system, the selected portion for use by the data processing system after applying the hardware change to the selected portion.

2. The method of claim 1, wherein the threshold is a time period.

3. The method of claim 1, wherein the threshold is an error level threshold and wherein determining whether the threshold has been reached comprises:
determining, by the data processing system, from the detected repairable errors whether the threshold has been reached.

4. The method of claim 1, wherein applying the hardware change to the selected portion comprises:
applying, by the data processing system, repair settings to a cache memory in the selected portion.

5. The method of claim 1, wherein determining whether a hardware change to the selected portion is required comprises:
determining, by the data processing system, whether an update to the data processing system requires a hardware change to the selected portion; and
responsive to a determination that the update to the data processing system requires a hardware change to the selected portion, generating, by the data processing system, the determination that the hardware change to the selected portion is required.

6. The method of claim 5, wherein applying the hardware change to the selected portion comprises:
updating, by the data processing system, initialization settings of the selected portion.

7. The method of claim 1, further comprising, before applying the hardware change to the selected portion:
blocking, by the data processing system, interrupts to the selected portion; and
turning off, by the data processing system, the selected portion.

8. A computer program product comprising a non-transitory computer readable storage medium having stored thereon computer program instructions for controlling a data processing system to change hardware in the data processing system, comprising:
computer program instructions stored on the non-transitory computer readable storage medium for detecting repairable errors on a selected portion of hardware in the data processing system, wherein the data processing system is a multi-processor system including a plurality of processor hardware units, wherein the selected portion is one of the plurality of processor hardware units;
computer program instructions stored on the non-transitory computer readable storage medium for determining, by the data processing system, whether a threshold has been reached;
computer program instructions stored on the non-transitory computer readable storage medium for responsive to determining that the threshold has been reached, generating, by the data processing system, a determination that a hardware change to be performed on the selected portion of hardware in the data processing system is required while the data processing system is executing a process on the selected portion;
computer program instructions stored on the non-transitory computer readable storage medium for controlling the data processing system to move the process executing on the selected portion to an alternate portion of the hardware in response to the determination that the hardware change to the selected portion is required, wherein the alternate portion is a different one of the plurality of processor hardware units;
computer program instructions stored on the non-transitory computer readable storage medium for controlling the data processing system to apply the hardware change to the selected portion while the process is executing on the alternate portion, wherein the hardware change is selected from the group consisting of changes to enable spare entries in a cache of the one of the plurality of processor hardware units, changes to update latch values of the one of the plurality of processor hardware units to steer data paths to spare bits on a hardware interface of the one of the plurality of processor hardware units to repair interface fails of the hardware interface, and combinations thereof, wherein applying the hardware change to the selected portion comprises: responsive to detecting the repairable errors in the data processing system building, by the data processing system, a restore image including repair settings required to repair the detected reparable errors; and applying, by the data processing system, the restore image to the selected portion to repair the repairable errors; and
computer program instructions stored on the non-transitory computer readable storage medium for controlling the data processing system to return the selected portion for use by the data processing system after applying the hardware change to the selected portion.

9. The computer program product of claim 8, wherein the threshold is a time period.

10. The computer program product of claim 8, wherein the threshold is an error level threshold, and further comprising:

computer program instructions stored on the non-transitory computer readable storage medium for controlling the data processing system to determine from the detected repairable errors whether the threshold has been reached.

11. The computer program product of claim 8, further comprising: computer program instructions stored on the non-transitory computer readable storage medium for controlling the data processing system to apply repair settings to a cache memory in the selected portion responsive to the determination that the hardware change to the selected portion is required.

12. The computer program product of claim 8, further comprising:
computer program instructions stored on the non-transitory computer readable storage medium for controlling the data processing system to determine whether an update to the data processing system requires a hardware change to the selected portion; and
computer program instructions stored on the non-transitory computer readable storage medium for controlling the data processing system to generate the determination that the hardware change to the selected portion is required responsive to a determination that the update to the data processing system requires a hardware change to the selected portion.

13. The computer program product of claim 12, further comprising:
computer program instructions stored on the non-transitory computer readable storage medium for controlling the data processing system to update initialization settings of the selected portion in response to the determination that the hardware change to the selected portion is required.

14. A data processing system, comprising a plurality of processor hardware units, wherein a first one of the plurality of processor hardware units is adapted to:
detect repairable errors on a selected portion of hardware in the data processing system, wherein the data processing system is a multi-processor system including a plurality of processor hardware units, wherein the selected portion is one of the plurality of processor hardware units;
determine whether a threshold has been reached;
responsive to determining that the threshold has been reached, generate a determination that a hardware change to be performed on the selected portion of hardware in the data processing system is required while the data processing system is executing a process on the selected portion;
move the process executing on the selected portion from the selected portion to an alternate portion of the plurality of processor hardware units in response to the determination that the hardware change to the selected portion is required, wherein the alternate portion is a different one of the plurality of processor hardware units;
apply the hardware change to the selected portion while the process is executing on the alternate portion, wherein the hardware change is selected from the group consisting of changes to enable spare entries in a cache of the one of the plurality of processor hardware units, changes to update latch values of the one of the plurality of processor hardware units to steer data paths to spare bits on a hardware interface of the one of the plurality of processor hardware units to repair interface fails of the hardware interface, and combinations thereof, wherein applying the hardware change to the selected portion comprises: responsive to detecting the repairable errors in the data processing system building, by the data processing system, a restore image including repair settings required to repair the detected reparable errors; and applying, by the data processing system, the restore image to the selected portion to repair the repairable errors; and
return the selected portion for use by the data processing system after applying the hardware change to the selected portion.

15. The data processing system of claim 14, wherein the threshold is a time period.

16. The data processing system of claim 14, wherein:
the threshold is an error level threshold; and
the first one of the plurality of processor hardware units is further adapted to determine from the detected repairable errors whether the threshold has been reached.

17. The data processing system of claim 14, wherein the first one of the plurality of processor hardware units is further adapted to:
apply repair settings to a cache memory in the selected portion in response to the determination that the hardware change to the selected portion is required.

18. The data processing system of claim 14, wherein the first one of the plurality of processor hardware units is further adapted to:
determine whether an update to the data processing system requires a hardware change to the selected portion; and
generate the determination that the hardware change to the selected portion is required in response to a determination that the update to the data processing system requires a hardware change to the selected portion.

19. The data processing system of claim 18, wherein the one of the plurality of processor hardware units is further adapted to:
update initialization of the selected portion in response to the determination that the hardware change to the selected portion is required.

* * * * *